(12) United States Patent
Tippett et al.

(10) Patent No.: US 9,553,872 B2
(45) Date of Patent: Jan. 24, 2017

(54) METHOD AND SYSTEM FOR PROVIDING ZERO SIGN ON USER AUTHENTICATION

(71) Applicant: Verizon Patent and Licensing Inc., Basking Ridge, NJ (US)

(72) Inventors: Peter Tippett, Great Falls, VA (US); Steven T. Archer, Dallas, TX (US); Tracy L. Hulver, Winchester, VA (US); Paul V. Hubner, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 217 days.

(21) Appl. No.: 14/033,139

(22) Filed: Sep. 20, 2013

(65) Prior Publication Data

US 2015/0089613 A1 Mar. 26, 2015

(51) Int. Cl.
H04L 29/06 (2006.01)

(52) U.S. Cl.
CPC ....... H04L 63/0853 (2013.01); H04L 63/0815 (2013.01); H04L 63/18 (2013.01)

(58) Field of Classification Search
CPC combination set(s) only.
See application file for complete search history.

(56) References Cited

U.S. PATENT DOCUMENTS

| | | | |
|---|---|---|---|
| 2007/0121174 A1* | 5/2007 | Higashiura | H04N 1/00363 358/464 |
| 2012/0068812 A1* | 3/2012 | Yamamoto et al. | 340/5.1 |
| 2012/0160912 A1* | 6/2012 | Laracey | 235/379 |
| 2012/0287290 A1* | 11/2012 | Jain | 348/207.1 |
| 2013/0097684 A1* | 4/2013 | Kim | 726/7 |
| 2013/0110607 A1* | 5/2013 | Basmajian | G06Q 30/0234 705/14.26 |
| 2013/0254858 A1* | 9/2013 | Giardina et al. | 726/7 |
| 2013/0262857 A1* | 10/2013 | Neuman | H04L 63/08 713/155 |
| 2013/0339141 A1* | 12/2013 | Stibel et al. | 705/14.49 |
| 2014/0007211 A1* | 1/2014 | Yang et al. | 726/7 |
| 2014/0033273 A1* | 1/2014 | Rathbun | 726/3 |
| 2014/0223175 A1* | 8/2014 | Bhatnagar | G09C 5/00 713/159 |
| 2014/0250518 A1* | 9/2014 | Schneider | G06F 21/34 726/9 |
| 2015/0261948 A1* | 9/2015 | Marra | G06F 21/34 726/4 |
| 2015/0304110 A1* | 10/2015 | Oberheide | H04L 63/06 713/155 |
| 2016/0099938 A1* | 4/2016 | Seo | H04L 63/0853 713/169 |

* cited by examiner

Primary Examiner — Taghi Arani
Assistant Examiner — Phy Anh Vu

(57) ABSTRACT

An approach for receiving a request for an authentication code for presentation in an authentication user interface, wherein the request is from a relying party and wherein the authentication user interface is presented by the relying party at a first device. The approach further involves transmitting the authentication code to the relying party. The approach also involves authenticating a user with respect to the relying party by determining that a second device associated with the user has read the authentication code from the authentication user interface of the first device, wherein the second device is a previously authenticated device.

14 Claims, 12 Drawing Sheets

METHOD AND SYSTEM FOR PROVIDING ZERO SIGN ON USER AUTHENTICATION

BACKGROUND INFORMATION

Given the reliance on computers, computing devices (e.g., cellular telephones, laptop computers, personal digital assistants, and the like), and automated systems (e.g., automated teller machines, kiosks, etc.) to conduct secure transactions and/or access private data, user authentication is critical. Traditional approaches to user authentication often require users to create and maintain multiple credentials for every account, as well as undergo multiple logins for these accounts daily even if the users have previously been authenticated. As a result, such traditional approaches place significant burdens on the user to remember and provide user credentials for authentication, thereby potentially creating a poor user experience. Thus, there is a need for an approach for applying a user authentication mechanism that is based on little to no manual sign on actions (i.e., zero sign on) by the user.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for an approach for providing zero sign on authentication. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
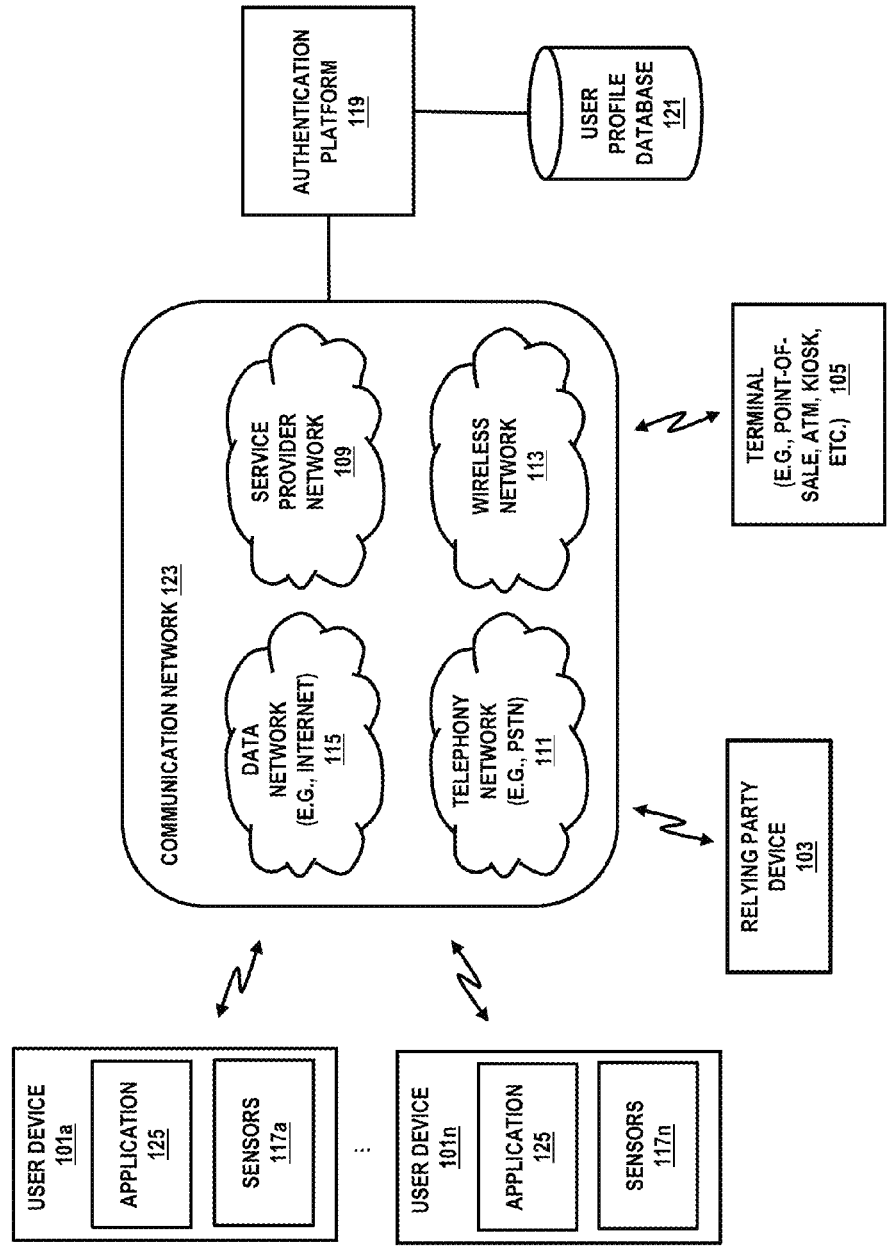
FIG. 1 is a diagram of a system capable of providing zero sign on user authentication, according to one embodiment.

FIG. 1 is a diagram of a system capable of providing zero sign on user authentication, according to one embodiment. Traditional approaches to user authentication often rely asking users to remember multiple logins for multiple accounts. These approaches potentially result in poor users experiences that place significant burdens on users which can be time consuming and taxing. Generally, a user may have one or more login accounts with a relying party (e.g., online bank, E-mail, other internet services/applications, etc.). The digitalization of just about every service imaginable, paired with the necessity to keep respective user accounts secure, leaves users often finding themselves with more logins than they can keep track of. This is evident in, for instance, the number of password management applications for mobile operating systems. As a result, service providers face significant technical challenges to providing an authentication system that enhances the security of user accounts while reducing the burden on users related to managing and providing user credentials across potentially multiple accounts and a services.

To address these challenges, a system 100 of FIG. 1 introduces the capability to provide a zero sign on authentication mechanism by using a unique authentication code (e.g., a bar code) provided by an authentication platform 119 to a relying party device 103 (e.g., a bank's web server). In one embodiment, a different unique authentication code is served to the relying party device 103 each time the relying party device 103 serves up a new authentication user interface (e.g., a new login web page). For example, each time a user visits the login page of a relying party, the authentication platform 119 provides a different and unique authentication code to be presented in the login page. A user who wishes to login to the website, can then use a previously authenticated device (e.g., user devices 101*a*-101*n*, also collectively referred to as user devices 101) to read the authentication code from the relying party's web page. For example, if the authentication code is presented as a barcode (e.g., a QR code) on the relying party's web page, the user device 101 can read the code by scanning the code via camera module (e.g., sensors 117*a*-117*n*, also collectively referred to as sensors 117). The user device 101 then presents the scan code to the authentication platform 119 for validation. Upon validation of the scanned authentication code from the user device 101, the authentication platform 119 notifies the relying party device 103 that the user can be automatically logged into the user's account with the relying party. For example, a user can login by waving the user device 101 in front of the relying party device 103's screen (e.g., a PC screen, a TV, or other display) that is displaying the user interface or site that the user wants to login to. In this way, the user can log into the relying party's web site or service simply by reading the authentication code from the relying party's web page to provide an essentially "zero sign on" authentication mechanism that does not rely on manual entry of the user's authentication credentials at the relying party's website.

The various embodiments of the zero sign on mechanism described herein enables the user to completely bypass entry or presentation of user authentication credentials (e.g., user name, password, personal identification number (PIN) codes, token codes, etc.). In fact, the user does not even need to know that any user authentication credentials exist. As a result, the user login/authentication process is easier, faster, and more frictionless (e.g., less burdensome) than traditional authentication mechanisms. In addition, because of the use of the user device 101 as a separate authentication path from the relying party device 103, the various embodiments described herein are at least a secure as other two-factor authentication mechanisms (e.g., RSA tokens, smartcards, biometric logins, etc.).

In one embodiment, the user opens a browser and navigates to a relying party's web page (or other authentication user interface) that requires user authentication at a first device (e.g., a first user device 101a such as a PC, tablet, etc.). As used herein, "relying party" refers to any entity that provides a service which may be accessible via a network and has partnered with authentication platform 119 for user authentications. As used herein, "point of access" refers to any web site, automatic teller machine (ATM), airport kiosk, home or business security system, vehicle security, safe, stationary or mobile device, software application, or any other system that may require authentication. The web page's web server (e.g., a relying party device 103) prompts the authentication platform 119 for an authentication code. The authentication platform 119 may create an authentication code that includes one or more session identifiers (e.g., 12345678) into a barcode, Quick Response (QR) code, audio tones (e.g., DTMF, musical phrases or human inaudible frequencies), patterns for modulating the device's LED, data for transmission over near field communications (NFC), ad-hoc WiFi, Bluetooth, Z-Wave, XBee, other local RF communications, or a combination thereof. In one embodiment, the session identifier identifies a particular login session that a replying party device 103 is serving to the user. In this way, the authentication code is generated uniquely and differently for each login session.

In response to the request from the relying party device 103, the authentication platform 119 creates/sends the authentication code via the web server (e.g., the relying party device 103). The web browser of the first user device 101 (e.g., the device that is displaying the relying party's login user interface or web page) displays the authentication code created by the authentication platform 119 along with, optionally, the traditional login prompts like username, password, and token as an alternative method of authentication. The user may possess a second user device 101b (e.g., a smartphone) that has previously been authenticated. In one embodiment, the previous authentication may include logging into a client application (e.g., an electronic wallet application) of the authentication platform 119. In addition or alternatively, previous authentication may also include logging into the device itself, another application or service on the device, or any other process that results in authentication of user credentials. In one embodiment, logging into an account with the authentication platform 119 by the second device 101b or otherwise establishing a previous authentication enables the authentication platform 119 to determine the user profile and associated relying party accounts. In one embodiment, the user may execute an application 125 associated with the authentication platform 119 in the second device 101b that has at least one sensor 117 capable of capturing the authentication code. On capture of the authentication code (e.g., reading a barcode from the relying party's login user interface), the second device 101b may transmit the captured authentication code to the authentication platform 119 for authentication and subsequent automatic login with the relying party.

At this point, the authentication platform 119 may signal the relying party device 103 to log the user into the website or service based on the authentication platform 119 profile associated with the user while also indicating to the second device 101b that the login was completed. In one embodiment, the second device 101b can indicate a successful or unsuccessful login attempt by presenting a notification of the user (e.g., a haptic notification, a pop-up notification, an audio notification, etc.). Thus, the authentication platform 119 may receive a request for an authentication code for presentation in an authentication user interface, wherein the request is from a relying party and wherein the authentication user interface is presented by the relying party at a first device; transmit the authentication code to the relying party; and authenticate a user with respect to the relying party by determining that a second device associated with the user has read the authentication code from the authentication user interface of the first device, wherein the second device is a previously authenticated device.

The system 100 (specifically, authentication platform 119 in combination with devices 101a-101n) then converts/transfers or captures/reverts, by way of example, one or more authentication codes (e.g., images or videos) to allow a user to apply a single authentication to multiple sessions with multiple relying parties. By way of example, the video can be in a format, e.g., Moving Picture Experts Group (MPEG) format (e.g., MPEG-2 Audio Layer III (MP3)), Windows® media format (e.g., Windows® Media Video (WMV)), Audio Video Interleave (AVI) format, as well as new and/or proprietary formats.

By way of illustration, authentication codes include, but are not limited to, human visible images (e.g., text, 2D graphic, 3D graphic, etc.). These authentication codes include bar codes, QR codes, icons, avatars, etc. Nonhuman visible authentication codes may also be used. For example, near infrared (NIR) signals, the Medium Wavelength IR (MWIR) signals and the Long Wavelength or Far Infrared (LWIR or FIR) signals may constitute nonhuman visible machine-transferrable authentication codes, though other animals may experience them, etc. In one embodiment, any authentication code capable of being captured can be converted by the authentication platform 119 and then captured by the user device 101a-101n (collectively referred to as user device 101) of the system 100 for processing.

For the purpose of illustration, the system 100 includes various devices 101-105, each of which are configured with respective cameras or other imaging devices to provide user authentication/identification based on authentication codes (e.g., authentication codes and optionally in conjunction with facial/voice recognition or other authentication credentials). Such authentication codes can aid the system 100, and specifically, authentication platform 119, in determining which sessions to login and associate with which user profile from user profile database 121. From this point, the authentication platform 119 may authenticate a session with that particular relying party based the registration of the user device 101 from which the authentication code was sent.

By way of example, when a user attempts to login using an authentication service supported by the system 100, the user may open a browser on the relying party (RP) device 103 that requests user authentication. The website displayed on the RP device 103 prompts user authentication and supplies an authentication code provided by the authentication platform 119 along with username, password, and token fields as an alternative authentication means. The user is already logged into the authentication platform's network via the application 125. The user captures the authentication code with the application 125 on the user device 101 (e.g., a user's registered device, such as a cell phone) with one of the user device (UD) 101's sensors 117a-117n (collectively referred to as sensors 117). The application 125 may transmit the captured authentication code to the authentication platform 119. At this point, the authentication platform 119 recognizes the authentication code and the registered UD 101 and/or application 125 login from which the authentication code was sent to determine the user profile and respective login account to associate with the session in question at the RP device 103. Thus, the authentication user interface is presented at a point of access.

The authentication code format may be selected by the system 100, and/or a user at the relying party device 103. In one embodiment, the system 100 selects the authentication code format. In another embodiment, the user selects the authentication codes format based on the capabilities of the devices 101, 103 (e.g., speaker, microphone, etc.), which may be automatically detected and made known to the user when the application 125 has been installed in the UD 101. For example, when the user loads a relying party login page and is given a default authentication code which the user's particular UD 101 cannot capture or that does not meet the user's preference, the user may request an authentication code of a different form that the user's UD 101 may capture. This request would be relayed through the relying party's website and fulfilled by the authentication platform 119 like the previous authentication code.

In one embodiment, the authentication code data can be used for authentication and/or identification, whereby one or more actions may be initiated based upon results of the authentication and/or identification. The actions may be granting access to one or more resources, reporting failed authentication and/or identification, taking actions against illegal access attempts, etc. Thus, a login of the user is initiated via the web page if the authentication of the user is successful.

In this example, the user device 101 includes application 125, which in one embodiment, is a graphical user interface (GUI) that is presented on a display (not shown) on the device 101 for capturing authentication codes via the camera or other sensors 117. Additionally, application 125 may also serve as a bridge for the user to authenticate his identity with the authentication platform 119 by allowing the user to log into the authentication platform 119 through the application 125. This initial login with the authentication platform 119 allows the authentication platform to authenticate the user in consequent login attempts at RPs. Alternatively, the user may authenticate his identity with the authentication platform by logging into his UD 101 operating system, email, or any other account which he may grant authorizing authority to. By authorizing authority, the user allows the authentication platform 119 the ability to apply the authorizing authentication to consequent login attempts. Ideally, the user would select an account which he may access via UD 101 so that he may only need the UD 101 in order to authenticate himself to the authentication platform 119. For example, if the user selects his phone operating system as his authorizing authority, he would link that login to his authentication platform login. Later, if the user wishes to login to a social networking site, the user may apply his authorizing authentication, the UD 101 operating system, to the social networking site login via the authentication platform 119. It is contemplated that the user may activate the UD 101's sensors via the application 125 by tapping a "Scanner" button or tab within the application. The application 125 is an application which may be available in any application marketplace and may be configured to communicate directly with the authentication platform.

By way of example, the user device 101 can be any type of computing device including a cellular telephone, smart phone, a laptop computer, a desktop computer, a tablet, a web-appliance, a personal digital assistant (PDA), and etc. Also, the approach for authenticating users, as described herein, can be applied to other devices, e.g., terminal 105, which can include a point-of-sale terminal, an automated teller machine, a kiosk, etc. In this example, user device 101 has sensors (e.g., camera) 117 that permit users to capture and eventually transport the authentication code to the authentication platform 119 for user verification.

The authentication approach begins within the relying party device 103 (e.g., a set-top box, a personal digital assistant, etc.). By way of example, the relying party device 103 can include a PC, an automated teller machine (ATM), a kiosk, a point-of-sales (POS) terminal, a vending machine, etc. In one embodiment, one or more of the sensors 117 of the UD 101 via application 125 determines, for instance, the authentication code received, such as images, sound and light, pressures, etc. A range and a scale of the sensor data may be defined for each element (images, sound and light, pressures, etc.). By way of example, a sound may be measured in decibel (dB), or range as low, medium and loud. The sensor data can be used by the authentication platform 119 to authenticate the user.

The UD 101, application 125 and/or the sensors 117 are used to determine format and form of the authentication code. The sensors 117 can be independent devices or incorporated into the UD 101. The sensors 117 may include an accelerometer, a gyroscope, a compass, a GPS device, microphones, touch screens, light sensors, or combinations thereof. The sensors 117 can be a microphone, a camera, a keyboard, a light detector, a Bluetooth receiver, a NFC receiver, a radar receiver, a head/ear phone, a wrist device, a pointing device, or a head mounted display. By way of example, a camera built into the UD 101 determines a QR code displayed on the screen of the RP device 103. The user can wear the UD 101 around a waist, wrist, knee, ankle, etc., to determine the authentication code. Thus, the authentication code is presented in the authentication user interface in a machine readable form, and wherein the machine readable form includes one or more audio-based forms, one or more visual-based forms, or a combination thereof.

In one embodiment, the UD 101 has a built-in light detector. The authentication code light data is converted back to the user device 101 and sent to the system 100 for authenticating the user. The authentication code light data can be used independently or in conjunction with visual/audio features to authenticate the user.

In one embodiment, terminal 105 (e.g., point of sale, ATM, kiosk, etc.) can be implemented to display an authentication code from the authentication platform 119, similar to those of the RP device 103.

The authentication platform 119 maintains a user profile database 121 that is configured to store the user identification (ID) of subscribers to the authentication service, according to one embodiment. Users may establish one or more sub-profiles including referencing other authentication credentials such as usernames, passwords, codes, personal identification numbers (PINs), etc. relating to user authentication as well as user accounts and preferences. While user profiles database 121 is depicted as an extension of service provider network 109, it is contemplated that user profiles database 121 can be integrated into, collocated at, or otherwise in communication with any of the components or facilities of system 100.

Moreover, database 121 may be maintained by a service provider of the authentication platform 119 or may be maintained by any suitable third-party. It is contemplated that the physical implementation of database 121 may take on many forms, including, for example, portions of existing repositories of a service provider, new repositories of a service provider, third-party repositories, and/or shared-repositories. As such, database 121 may be configured for communication over system 100 through any suitable messaging protocol, such as lightweight directory access protocol (LDAP), extensible markup language (XML), open database connectivity (ODBC), structured query language (SQL), and the like, as well as combinations thereof. In those instances when database 121 is provided in distributed fashions, information and content available via database 121 may be located utilizing any suitable querying technique, such as electronic number matching, distributed universal number discovery (DUNDi), uniform resource identifiers (URI), etc.

The communication network 123 of system 100 may include one or more networks, such as data network 115, service provider network 109, telephony network 111, and/or wireless network 113. As seen in FIG. 1, service provider network 109 enables terminal 105 to access the authentication services of authentication platform 119 via the communication network 123, which may comprise any suitable wireline and/or wireless network. For example, telephony network 111 may include a circuit-switched network, such as the public switched telephone network (PSTN), an integrated services digital network (ISDN), a private branch exchange (PBX), or other similar networks. Wireless network 113 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), third generation (3G), fourth generation (4G) Long Term Evolution (LTE), etc., as well as any other suitable wireless medium, e.g., microwave access (WiMAX), wireless fidelity (WiFi), satellite, and the like. Meanwhile, data network 115 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 109 and 111-115 may be completely or partially contained within one another, or may embody one or more of the aforementioned infrastructures. For instance, service provider network 109 may embody circuit-switched and/or packet-switched networks that include facilities to provide for transport of circuit-switched and/or packet-based communications. It is further contemplated that networks 109 and 111-115 may include components and facilities to provide for signaling and/or bearer communications between the various components or facilities of system 100. In this manner, networks 109 and 111-115 may embody or include portions of a signaling system 7 (SS7) network, or other suitable infrastructure to support control and signaling functions. While specific reference will be made hereto, it is contemplated that system 100 may embody many forms and include multiple and/or alternative components and facilities.

In one embodiment, an authentication code can be created either in series (e.g., a set of LED flash pattern and then audio tones of the end of "The Star-Spangled Banner", etc.), in parallel (e.g., a set of LED flash pattern concurrently with the audio tones), or both. In other embodiments, the system 100 provides for increased authentication factors by combining an authentication code with other authentication mechanisms such as image recognition (e.g., facial recognition), etc. Additionally, a communications modality between the radio or flashing lights, or any other modality that may be local to the user, could be anything at all, e.g., it might be Morse code, or DTMF, or text as translated by OCR. Therefore, the approach of system 100, according to certain exemplary embodiments, utilizes authentication codes (e.g., multiple authentication factors such as both image recognition and authentication code recognition) to produce strong authentication with relatively more ease. That is, the user may deploy one or a sequence of authentication codes without human entry errors.

For example, the authentication platform 119 may require an additional level of authenticating a user based on the user's activities. For example, in the case where the user logs into his bank and then proceeds to check is bank account balance, a level one factor login may suffice (e.g., QR code read via UD 101 to authentication platform 119). However, in the case where the user has successfully completed a level one factor login but proceeds to undertake activities of greater consequences, such as transferring a million dollars out of the account, the relying party website and authentication platform 119 may require a higher level factor login. For instance, before the user may be permitted to transfer a million dollars from his account, he may be required to complete a second or third factor authentication credential such as a biometric, such as face/voice/fingerprint recognition; a possession factor like a soft or hard token in a range of embodiments; or a pseudo second factor, like geo-location, or behavioral factors.

In an embodiment, the authentication platform 119 receives the authentication code from the user device 101. The authentication process may comprise, for example, identifying the authentication code received as generated by the authentication platform 119 for a specific session with the relying party's website, identifying the user account associated with the registered user device 101, and validating the user's session with the account login that is associated with the UD 101's registration information. Thus, the authentication platform 119 may receive the authentication code from the user device 101, wherein the determination that the user device 101 has read the authentication code is based on a validation of the authentication code.

According to one embodiment, the system 100 may authenticate a user when the relying party's website is displayed on the UD 101, that is, when the user is browsing the internet on his UD 101 and authentication at the relying party's website is required. In this scenario, the user may load the web page with the authentication code generated and displayed on the UD 101's screen. The user may take a screen shot capturing the QR code or other generated authentication code from the authentication platform 119, and submit this image to the authentication platform 119's application 125. When the authentication platform 119 reads the image sent from the UD 101 and authorizes the session with a valid login, the user may receive a notification that the login is successful and may be automatically redirected to the web browser to begin the active session at the relying party's website.

According to one embodiment, the authentication platform may generate a different authentication code for each login request that the authentication platform may receive from the web server. For example, if a hundred users are loading the login page for a relying party's website at the same time, the authentication platform may generate a hundred different authentication codes, with no duplicates, one for each session. Additionally, if one of the one hundred users reloads the page, the authentication platform may generate a 101th authentication code for the session. Thus, the authentication platform may generate the authentication code as a unique code for a session of the authentication user interface.

Figure 2:
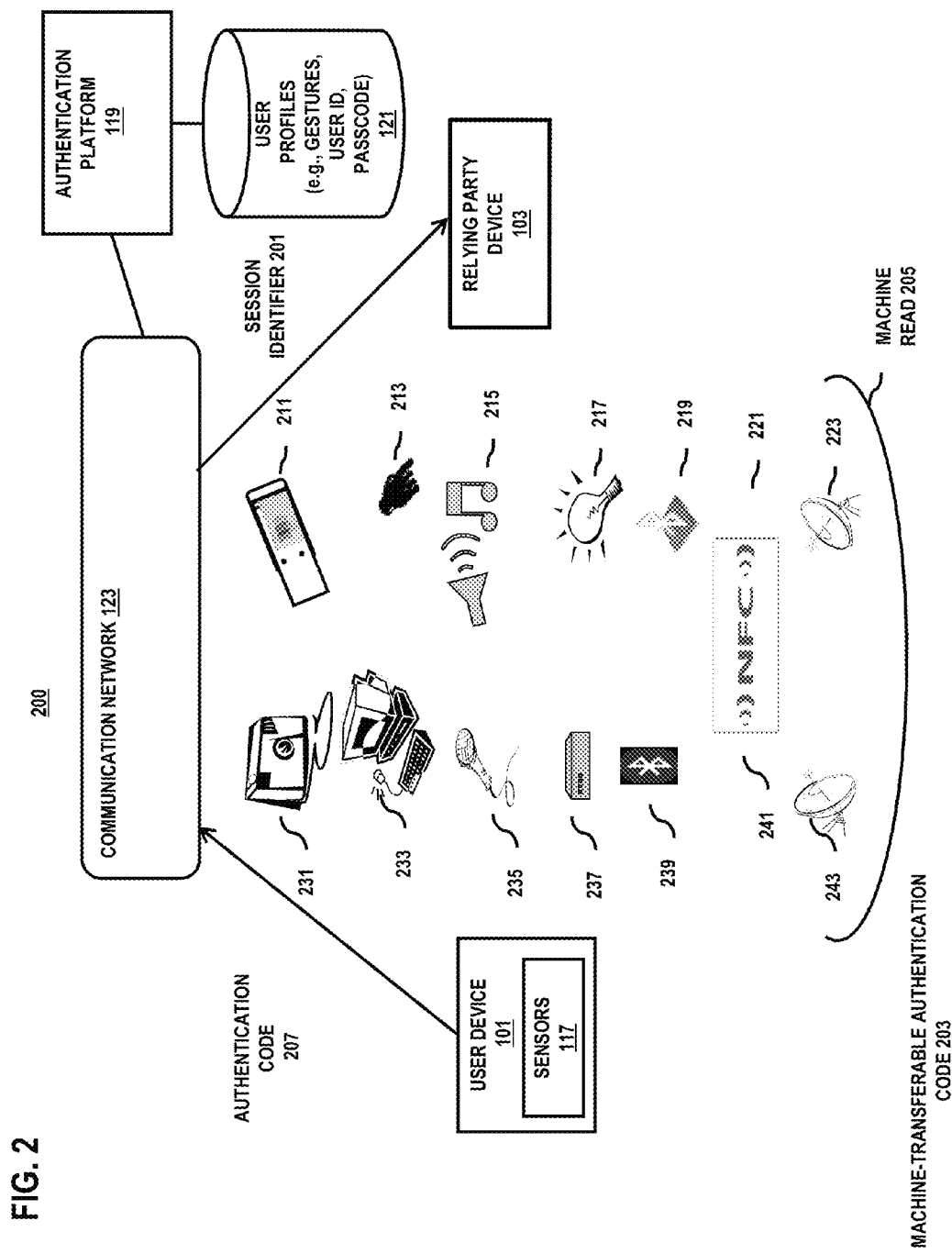
FIG. 2 is a diagram of providing zero sign on user authentication, according to one embodiment.

FIG. 2 is a diagram of providing zero sign on user authentication, according to one embodiment. In one embodiment, when a user attempts to login, for example, an online auction website, using an authentication service supported by the system 100, the user opens a browser and navigates to the point of sale to access the relying party device 103 (e.g., a check-out reader) that requests user authentication. The RP's web server will request a unique authentication code to identify this session from the authentication platform 119.

Thereafter, the authentication platform 119 converts the session identifier 201 (e.g., 12345678) into a machine-transferrable authentication code 203 "as is" (e.g., 12345678), scrambled (e.g., 56781234), encrypted (e.g., *&^!0D), watermarked, etc. The machine-transferrable authentication code 203 is then transferred via communication network 123 to the relying party device 103. The RP's website will display this machine-transferrable authentication code 203 on the RP device 103. The user captures the machine-transferrable authentication code 203 displayed on the RP device 103 via a machine read 205 using a registered user device 101, and then sends this image of the authentication code 207 back to the authentication platform 119 with the registration information of the UD 101. If the authentication platform 119 recognizes the authentication code 207, the UD 101 from which the code was sent, and the user profile associated with the UD 101, and the authentication platform 119 validates the session at the RP device 103 with the registered UD 101's user profile information and sends a notification of a successful login to the user device 101.

On the receiving side, the UD 101 uses a built-in camera or a stand-alone camera 231 to capture the machine-transferrable authentication code 203. Visual machine-transferrable authentication code recognition can be conducted with techniques such as computer vision, image processing, etc. By way of example, computer vision involves capturing machine-transferrable authentication codes rendered via a computing device (e.g., tablet, smart phone, laptop, etc.).

As an additional authentication mechanism, the user manually 213 enters the session identifier 201 into an input device (e.g., a keyboard, a mouse, a touch screen, etc.) 233 of the UD 101 or one or more devices (e.g., a smart phone, TV, set-top box, kiosk, rental media player, etc.) in its proximity.

In one embodiment, the RP device 103 renders the machine-transferrable authentication code 203 as audible signals (e.g., sound, tone, volume, pitch, expression, pronunciation, pauses, accents, emphasis; and of course, periods of silence, etc.) on its own speaker 215 or on the speaker of a stand-alone device (e.g., a smart phone, TV, set-top box, kiosk, rental media player, speaker, intercom, etc.). On the receiving side, the UD 101 uses a built-in or stand-alone microphone 235 to capture the machine-transferrable authentication code 203.

For example, known methods of sound/voice analysis may be used to create and analyze the melody, bass line, and/or chords in sound/voice. Such methods may be based on, for example, using frame-wise pitch-salience estimates as features. These features may be processed by an acoustic model for note events and musicological modeling of note transitions. The musicological model may involve key estimation and note bigrams which determine probabilities for transitions between target notes. A transcription of a melody or a bass line may be obtained using Viterbi search via the acoustic model. Furthermore, known methods for beat, tempo, and downbeat analysis may be used to determine rhythmic aspects of sound/voice. Such methods may be based on, for example, measuring the degree of sound change or accent as a function of time from the sound signal, and finding the most common or strongest periodicity from the accent signal to determine the sound tempo.

In one embodiment, the RP device 103 renders the machine-transferrable authentication code 203 as light signals via one or more built-in LED light emitters or on stand-alone LED device 217. The machine-transferrable authentication code 203 may be encoded into various colors, volumes, patterns, pauses, etc. transferred via one or more LED emitters. By way of example, "0" is coded as "green LED light" while "1" is coded as "red LED light," and each of the ASC control codes and characters may be encoded via "0" and "1." On the receiving side, the UD 101 uses a built-in or a stand-alone LED light receiver 237 to capture the machine-transferrable authentication code 203.

In various embodiments, the RP device 103 renders the machine-transferrable authentication code 203 as electrical or/and electromagnetic signals, such as Bluetooth, near field communications, radar, etc. via a Bluetooth transmitter 219, a near field communications transmitter 221, a radar transmitter 223, etc., respectively. On the receiving side, the UD 101 uses a built-in or a stand-alone Bluetooth receiver 239, a near field communications receiver 241, radar receiver 243, etc., respectively to capture the machine-transferrable one-time password code 203.

Figure 3:
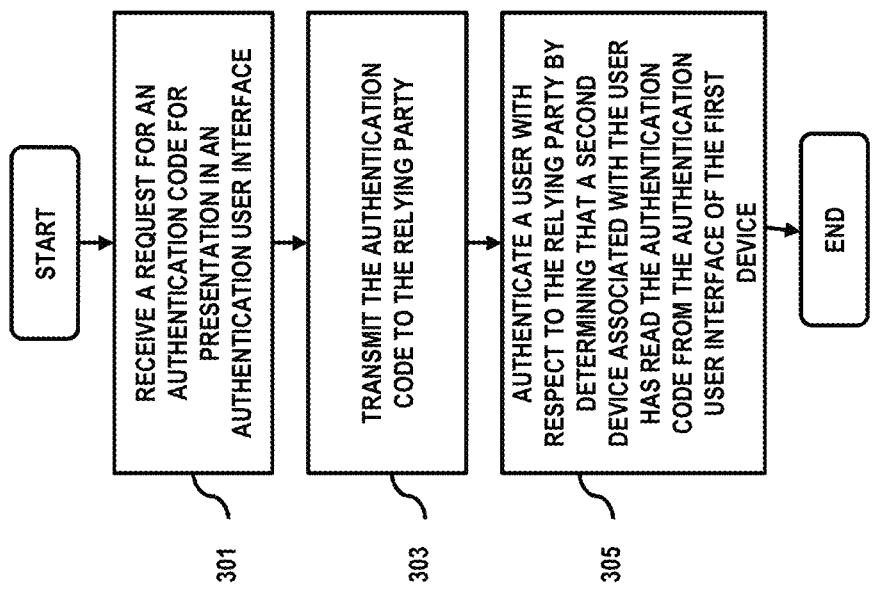
FIG. 3 is a flowchart of a process for providing zero sign on user authentication, according to one embodiment.
Figure 9:
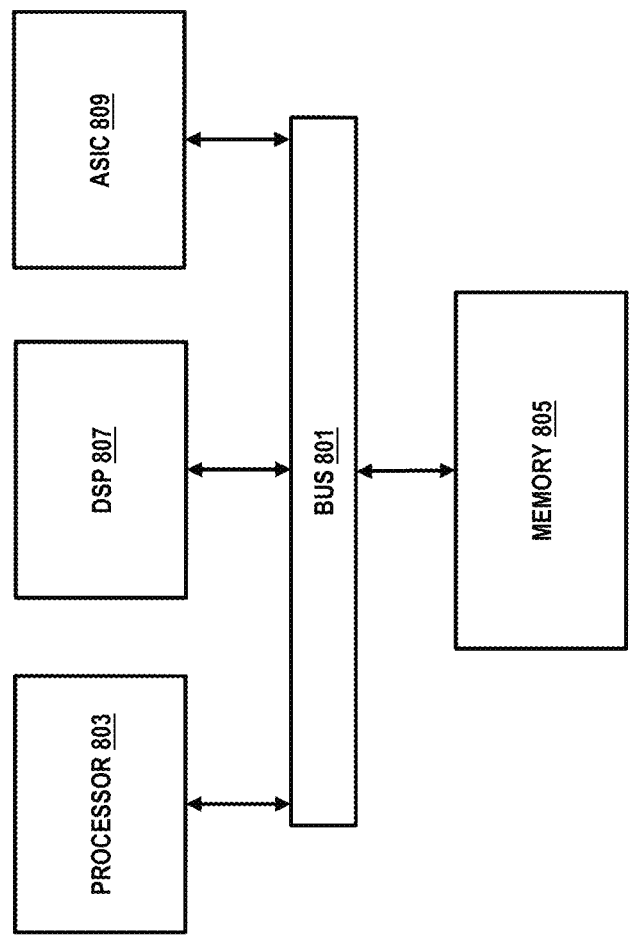
FIG. 9 is a diagram of a chip set that can be used to implement various exemplary embodiments.

FIG. 3 is a flowchart of a process for providing zero sign on user authentication, according to one embodiment. By way of example, this authentication process is explained with respect to the authentication platform 119, user device 101, and the relying party device 103. Other authentication services can perform the functions of the authentication platform 119. Other devices, such as the terminal 105 (e.g., point of sale, ATM, kiosk, etc.), etc. with access to communication network 123 can implement the functions of the relying party device 103. In one embodiment, the authentication platform 119 performs the process 300 and is implemented in, for instance, a chip set including a processor and a memory as shown in FIG. 9. Although FIG. 3 illustrates steps 301 through 305 in a particular order, the order and number of steps is merely for explanation, and one or more steps may be performed in a different order or removed.

In step 301, the authentication platform 119 may receive a request for an authentication code for presentation in an authentication user interface, wherein the request is from a relying party and wherein the authentication user interface is presented by the relying party at a first device. The authentication platform 119 may receive a request for an authentication code from any relying party device capable of communicating through the communication network 123 and processing login information. For example, a passenger at an airport for a commercial flight that has associated his flight information with his authentication platform profile may attempt to check in at an airport kiosk. After the passenger prompts the kiosk with a flight check-in request, the web server serving the kiosk may request an authentication code from the authentication platform 119. The authentication platform 119 generates an authentication code for display at the kiosk.

In step 303, the authentication platform 119 may transmit the authentication code to the relying party. After receiving an authentication code request, the authentication platform 119 may generate a random code, which would be unique from any other code generated by the authentication platform in past and future requests. After generating this unique code, the authentication platform 119 may transmit this code back to the web server, and eventually RP device 103, from which the user initially loaded the login page via communication network 123. Continuing with the above example, the authentication platform 119 may transmit the unique authentication code made to identify this specific check-in session to the kiosk any one or more of the networks in communication network 123.

In step 305, the authentication platform 119 may authenticate a user with respect to the relying party by determining that a second device associated with the user has read the authentication code from the authentication user interface of the first device, wherein the second device is a previously authenticated device. The user trying to log into the first device, or RP device 103, should already be a registered user in with the authentication platform. That is, the user had established a profile with the authentication platform and registered his UD 101 and RP account logins with the authentication platform 119. Additionally, the user had already authenticated his identity with the UD 101 through the authentication platform 119. Thus, the system 100 has already authenticated the user of the device is the same person as the registered owner of the device. Thus, when the authentication platform receives from this user's device 101 an image of the authentication code sent to the kiosk from the earlier example, the authentication platform will know to apply this user's already authenticated credentials to the kiosk's check-in system such that the kiosk may notify the airline company that this passenger is present and checked-in for boarding. Additionally, the authentication platform 119 may send confirmation of this authorization to the UD 101, which may notify the user of a successful check-in.

Figure 4:
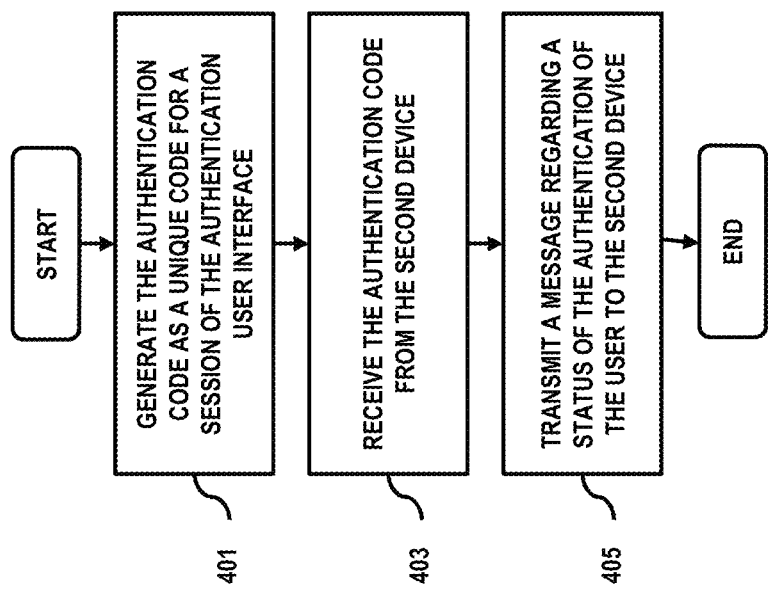
FIG. 4 is a flowchart a process for providing zero sign on user authentication, according to one embodiment.

FIG. 4 is a flowchart a process for providing zero sign on user authentication, according to one embodiment. By way of example, this authentication process is explained with respect to the authentication platform 119, user device 101, and the relying party device 103. Other authentication services can perform the functions of the authentication platform 119. Other devices, such as the terminal 105 (e.g., point of sale, ATM, kiosk, etc.), etc. with access to communication network 123 can implement the functions of the relying party device 103. In one embodiment, the authentication platform 119 performs the process 300 and is implemented in, for instance, a chip set including a processor and a memory as shown in FIG. 9. Although FIG. 4 illustrates steps 401 through 405 in a particular order, the order and number of steps is merely for explanation, and one or more steps may be performed in a different order or removed.

In step 401, the authentication platform 119 may generate the authentication code as a unique code for a session of the authentication user interface, wherein the authentication user interface is presented at a point of access, and wherein a login of the user is initiated via the web page if the authentication of the user is successful. As previously mentioned, the authentication codes which are generated for particular sessions are unique and are not replicated by the authentication platform 119. In this manner, when the authentication codes are received from the second devices, or UD 101, the authentication platform 119 may immediately link the account associated with the UD 101 to a single session. While the login prompt may be used to authenticate a web page login, according to one embodiment, the login prompt may be applied to an authentication process for a home security system. A home security system network may be connected with communication network 123 and has a display and/or speakers capable of transmitting sounds, images, or videos may utilize the authentication process of system 100. According to one embodiment, when the user would like to enter his home, he may press a button on the home security system. The home security system may initiate a request on its web server to request an authentication code from authentication platform 119. In response to this request, the authentication platform 119 may generate a unique image for the security system to display. The user may capture the image on his UD 101 by opening the authentication application and tapping on the "scan" button to activate the UD 101's sensors 117, in this case, a camera. The camera may capture the image and send it to the authentication platform 119 for authorization.

In step 403, the authentication platform 119 may receive the authentication code from the second device, wherein the determination that the second device has read the authentication code is based on a validation of the authentication code. When the authentication platform 119 receives an authentication code from a UD 101, the authentication code may come tagged with information regarding the UD 101 and/or application 125 from which the captured authentication code was sent. The authentication platform 119 may trace the information of the UD 101 and/or application 125 to the appropriate user profile. Once the authentication platform 119 identifies the appropriate profile, the authentication platform may proceed to authenticate the user's account with the relying party's website or point of access. Proceeding with the example above, when the authentication platform 119 receives the image captured from the homeowner's UD 101, a personal mobile phone, the authentication platform 119 may read the image in conjunction with the device information from which the image was sent, that is, the homeowner's cell phone and/or the application 125 that contains an active session with the authentication platform 119. The UD 101 and/or application 125 information supplied allows the authentication platform 119 to authenticate the session with the homeowner's profile, as the image was taken by his person mobile phone.

In step 405, the authentication platform 119 may transmit a message regarding a status of the authentication of the user to the second device, wherein the second device presents the status to the user and the authentication code is presented in the authentication user interface in a machine readable form, and wherein the machine readable form includes one or more audio-based forms, one or more visual-based forms, or a combination thereof and the one or more visual-based forms includes a barcode, and wherein the reading of the barcode by the second device is by a barcode scanning application. Once the authentication platform 119 determines that the authentication process is complete, the authentication platform 119 may authenticate the user at the first device, or RP device 103, and notify the user of the results of the authentication code submission on the second device, or UD 101. As previously mentioned, the authentication code may take a number of forms, including a series of numbers, an image, blinking lights, sounds, etc. Continuing with the above example, once the authentication platform 119 identifies that the homeowner has sent the authorization code (via the profile associated with his UD 101 and application 125 login), the authentication platform 119 may authorize the homeowner to the home security system's web server, authorizing entry into the home and identify the homeowner as such. Meanwhile, the authentication platform 119 may send a notification to the homeowner's UD 101 to indicate that the login attempt was successful. Thus, the system 100 may be applied to online account access as well as users' homes, offices, and vehicles.

Figure 5:
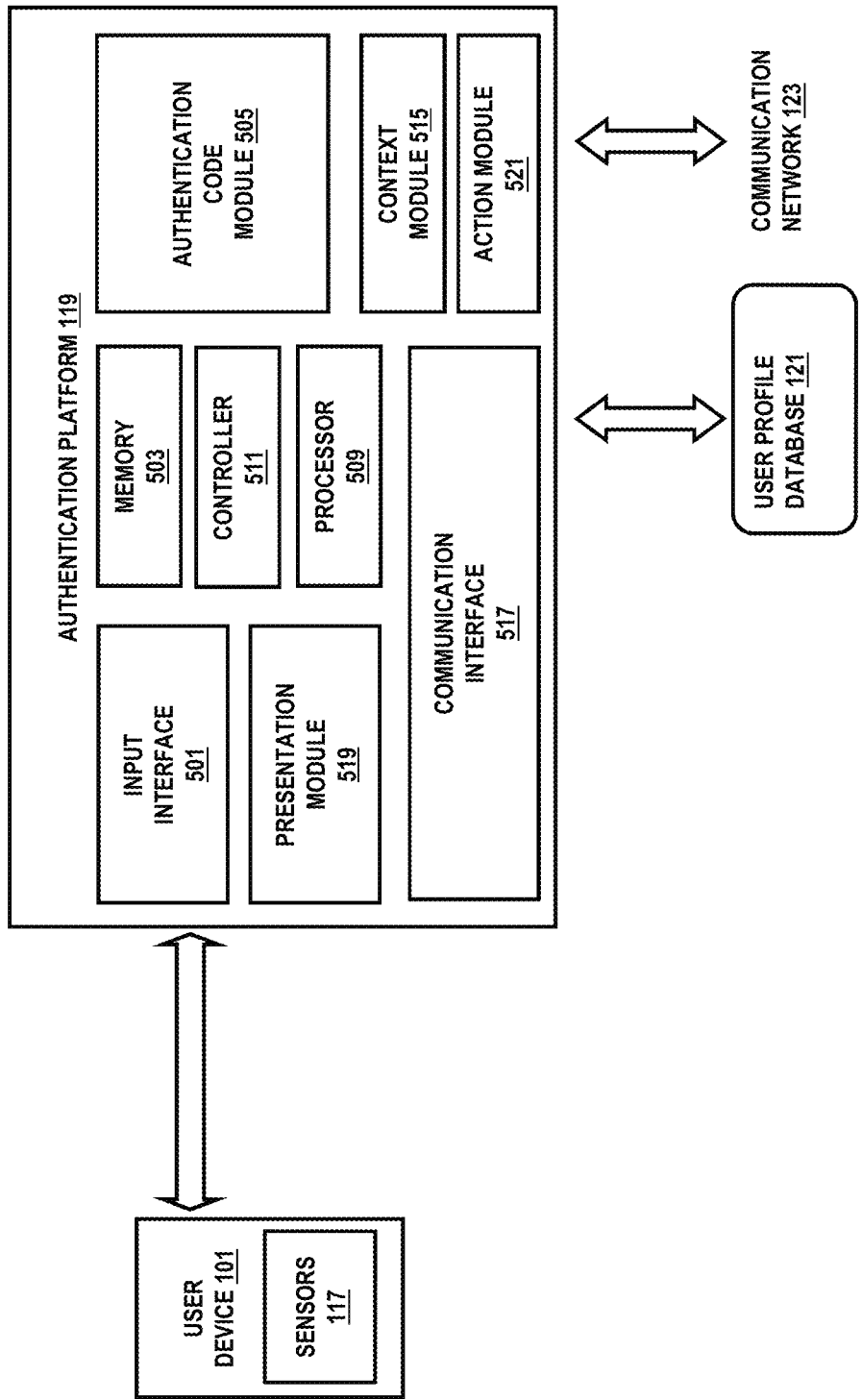
FIG. 5 is a diagram of an authentication platform configured to provide zero sign on user authentication, according to one embodiment.

FIG. 5 is a diagram of an authentication platform configured to provide zero sign on user authentication, according to one embodiment. The authentication platform 119 may comprise any suitable technology to send user profile information and associated authentication credentials to the RP device 103, and receive authentication code, a machine-transferrable authentication code format, and/or a machine-transferrable authentication code.

In this example, the authentication platform 119 includes an input interface 501 that also receives machine-transferrable authentication codes transferred from the user device 101 via one or more sensors 117 (e.g., a camera device, a microphone, etc.). Also, an authentication code module 505 resides within the authentication platform 119 to coordinate the authentication process with the RP's web servers (not shown) via communication network 123.

The authentication platform 119 also includes a memory 503 for storing the user profile information and associated authentication credentials, the captured machine-transferrable authentication code (e.g., images, audio data, etc.) for converting the codes back to session identifiers, as well as instructions that are performed by a processor 509. The machine-transferrable authentication codes may include machine-transferrable authentication codes, voice machine-transferrable authentication code, machine-transferrable audio authentication codes, or a combination thereof. In addition to the memory 503, the authentication platform 119 may also store user profile information and associated authentication credentials at the user profile database 121.

In some embodiments, either the authentication code module 505, or an additional module of the authentication platform 119, or the UD 101, separately or jointly performs machine-transferrable authentication code conversion and/or recognition. By way of example, the authentication code module 505 converts session identifiers into a 2D or 3D machine-transferrable visual authentication code via processing the code using a conversion formula or model. The conversion formula or model can be used to convert the session identifier into different machine-transferrable visual authentication codes.

In other embodiments, different forms of machine-transferrable authentication codes are deployed alone and/or in conjunction with traditional authentication means to strengthen the authentication and/or identification. By way of example, the sensors 117 measures a person's physiological state and/or conditions (e.g., a heart rate, fingerprints, etc.) when performing various machine-transferrable authentication codes (e.g., 2D image of a one-time password, etc.). The authentication platform 119 then utilizes both sets of data for authentication and/or identification. As another example, the sensors 117 collects sounds generated by the speaker of the user device 101 when capturing various machine-transferrable visual authentication codes (e.g., 3D images of encrypted session identifier), and then uses both sets of data for authentication and/or identification.

In the above-mentioned embodiments, the authentication platform 119 analyzes the plurality of data sets to determine one or more features of each of the machine-transferrable authentication codes. The authentication platform 119 then reverts the code(s) back to a session identifier based on the features of the machine-transferrable authentication code. The features include content information, timing information, ranging information, or a combination thereof.

Alternatively, the functions and operations of the authentication platform 119 may be governed by a controller 511 that interacts with each of the authentication platform 119 components to configure and modify user profiles.

Communication interface 517 may be configured to send user profile information from the authentication platform 119, and to receive an authentication code from the UD 101.

An authentication code module 505, in addition to supporting the described authentication scheme, may be provided at the authentication platform 119 to initiate or respond to authentication schemes of, for instance, service provider network 109 or various other content providers, e.g., broadcast television systems, third-party content provider systems (not shown). Authentication code module 505 may provide sufficient authentication information, e.g., a user name and pass code, a key access number, a unique machine identifier (e.g., GUID or MAC address), and the like, as well as combinations thereof, to a corresponding network interface for establishing connectivity and/or user authentication. Further, authentication information may be stored locally at memory 507, or at a remote repository, e.g., user profile database 121.

The presentation module 519 may interact with input interface 501 for configuring (e.g., modifying) user preferences, application 125 interfaces, and allowing users to personalized the login attempt notifications on their UD 101.

An action module 521 may be configured to determine one or more actions to take based upon the authenticating results from the authentication module 505. For example, in the case where the authentication code received is from a UD 101 that contains a valid registered session, the action module 521 may have the communication interface 517 prompt the UD 101 to notify the user that the authentication has been validated while simultaneously communicating to the RP's web server the same. Conversely, if the authentication code received from the UD 101 was sent from a device that is not recognized by the authentication platform 119, the action module 521 may instruct the UD 101 and the RP's web server to display a login failure notification.

A context module 515 may be configured to determine context and/or context tokens of the user's authentication. The user context includes context characteristics/data of a user and/or the user device, such as a date, time, location, current activity, weather, a history of activities, etc. associated with the user, and optionally, user preferences. The context tokens associated with a person may be a birthday, health, moods, clothes, etc. of the person. The context tokens associated with an activity element may be the time, location, equipment, materials, etc. of the activity. The context tokens associated with an object of interest may be a color, size, price, position, quality, quantity, etc. of the object. The authentication platform 119 may use these context and context tokens to further validate the authenticity of a login attempt.

It is noted that the described authentication process, according to certain embodiments, can be provided as a managed service via service provider network 109.

Figure 6:
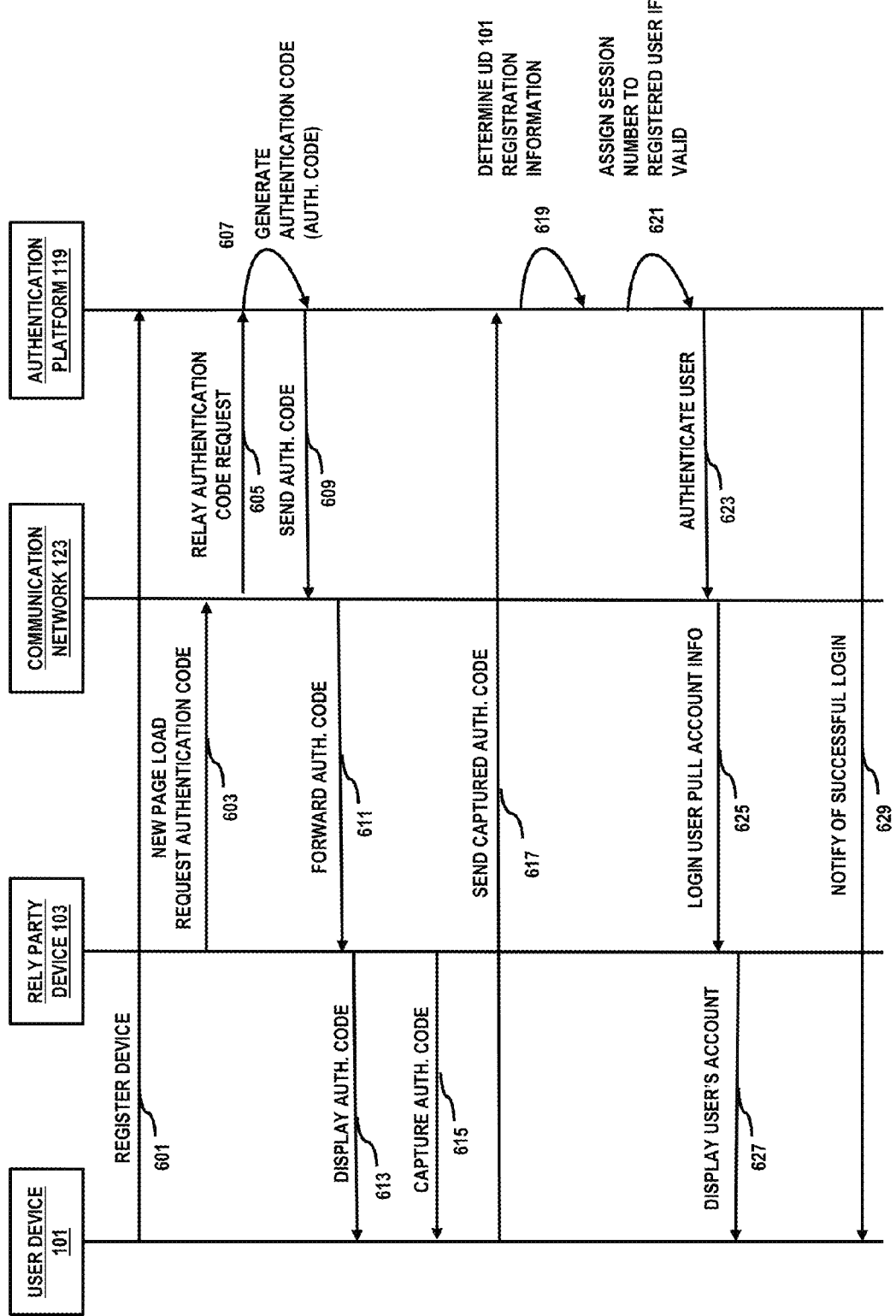
FIG. 6 is a ladder diagram of a system capable of applying a single authentication to multiple sessions, according to one embodiment.

FIG. 6 is a ladder diagram of a system capable of applying a single authentication to multiple sessions, according to one embodiment. In step 601, a user registers his UD 101 with the authentication platform 119. This registration process involves associating the user's accounts with relying parties with the user's profile with the authentication platform 119. The user authorizes the authentication platform 119 to associate his accounts with relying parties with his UD 101 by linking up his device with his user profile at the authentication platform 119. In step 603, the relying party device 103 must load a new webpage and request an authentication code from the corresponding web server through the communication network 123. In step 605, the communication network 123 relays the request for an authentication code to the authentication platform 119. In step 607, the authentication platform 119 generates an authentication code and in step 609, the authentication platform sends the code back to the web server from which the request was sent. The code generated by the authentication platform 119 is associated with the relying party's session that requested the code. In step 611, the web server may forward the code to the relying party device 103 via the communication network 123. In step 613, the relying party device displays the code generated by the authentication platform 119. When this image is displayed on the relying party device 103, the UD 101 may capture the image, sound, video, etc. generated as the authentication code in step 615.

In step 617, the user device 101 may transfer the authentication code to the authentication platform 119 via the communication network 123. In step 619, the authentication platform 119 determines the UD 101 registration information from which the code was sent. In step 621, the authentication platform 119 may assign the session to the user profile associated with the UD 101 that sent the authentication code. In step 623, the authentication platform 119 may authenticate the user profile associated with the UD 101 with the web server via communication network 123. In step 625, the web server logs the account holder's into the relying party's website and in step 627, the relying party device 103 may display the user's account with the relying party. In step 629, the authentication platform may notify the UD 101 of the successful login at the relying party's website.

Figure 7A:
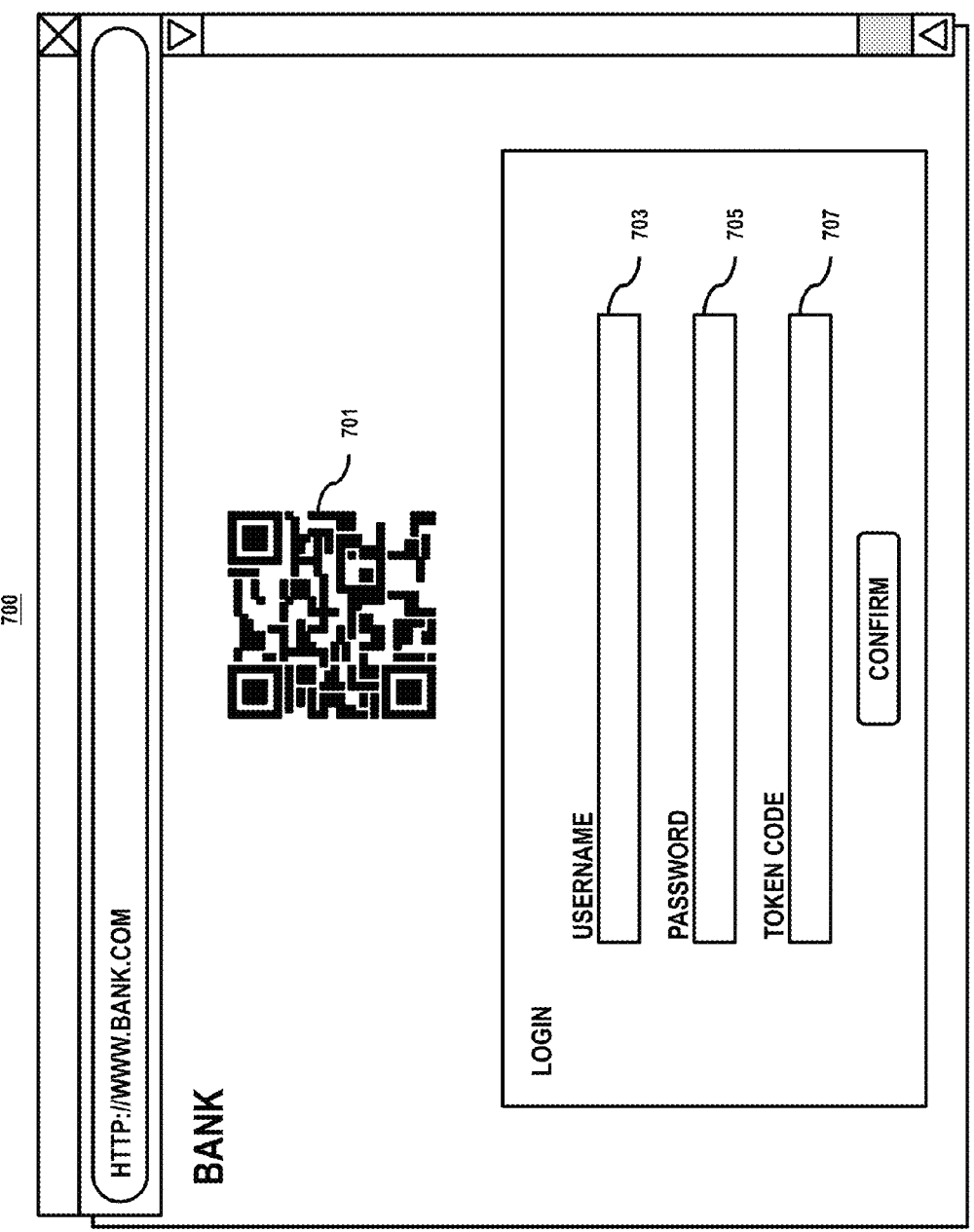
FIGS. 7A-7D are diagrams of user interfaces utilized in the processes of FIGS. 3-4, according to various embodiments.
Figure 7B:
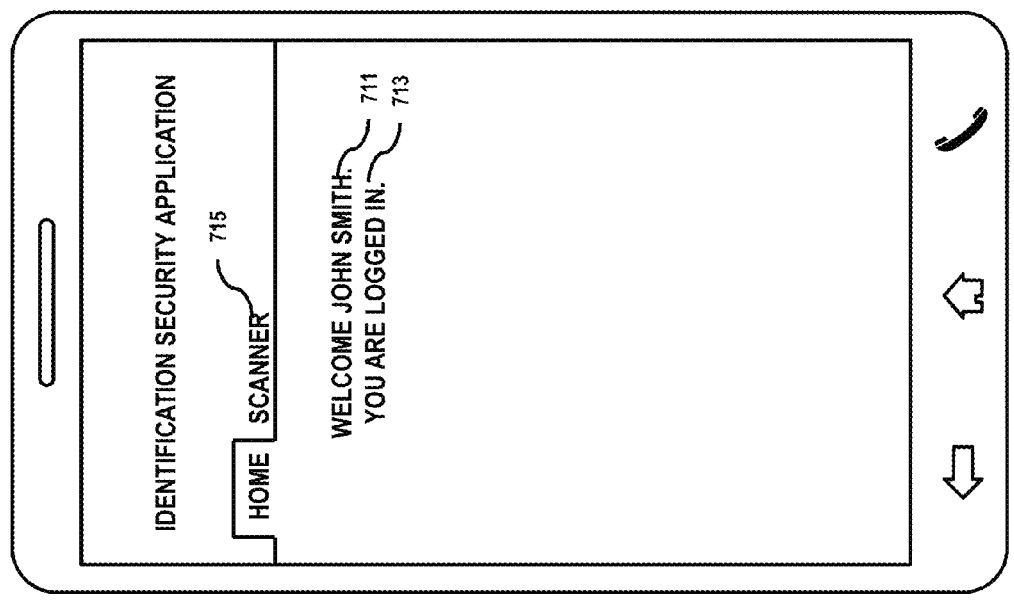
Figure 7C:
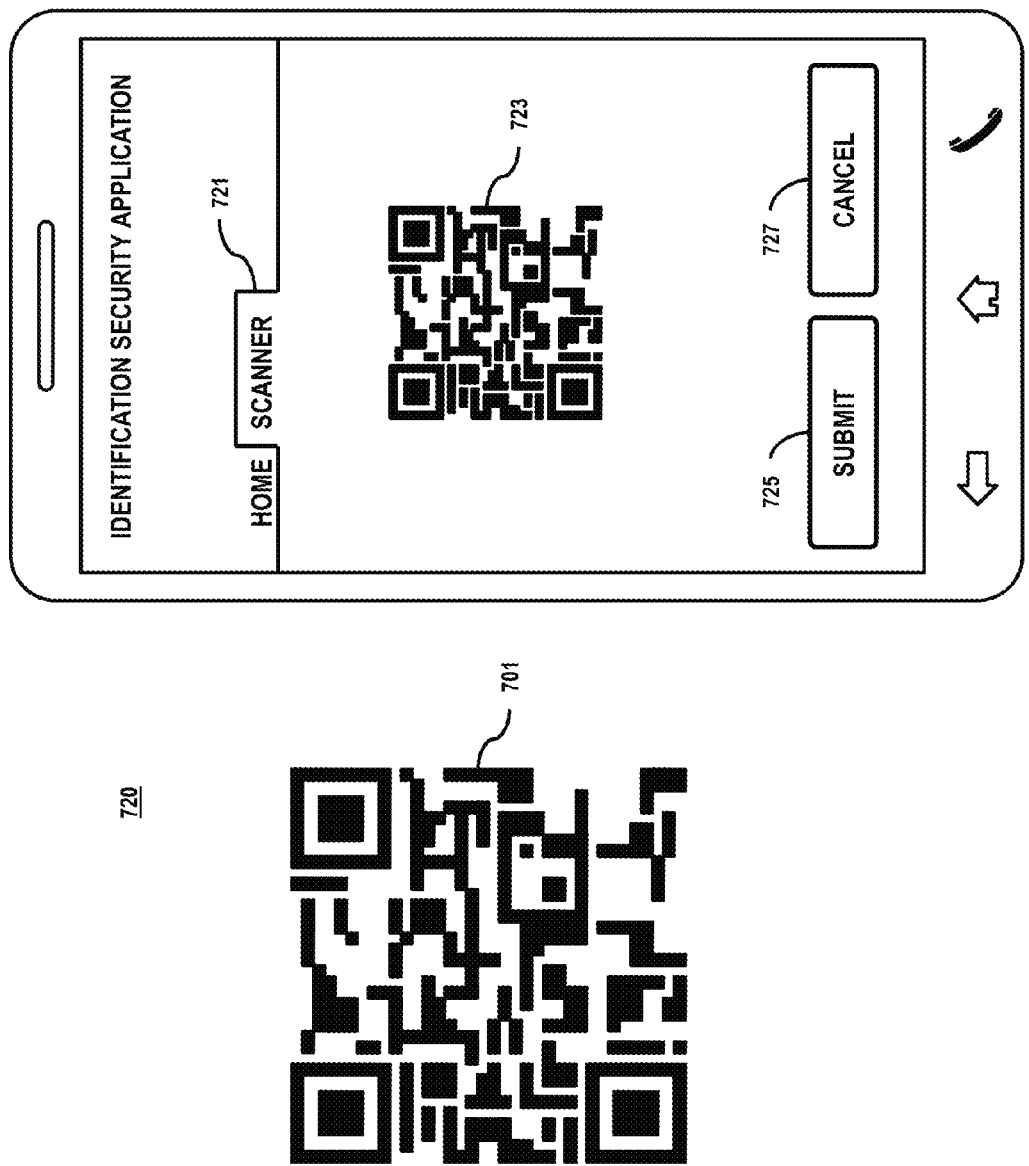
Figure 7D:
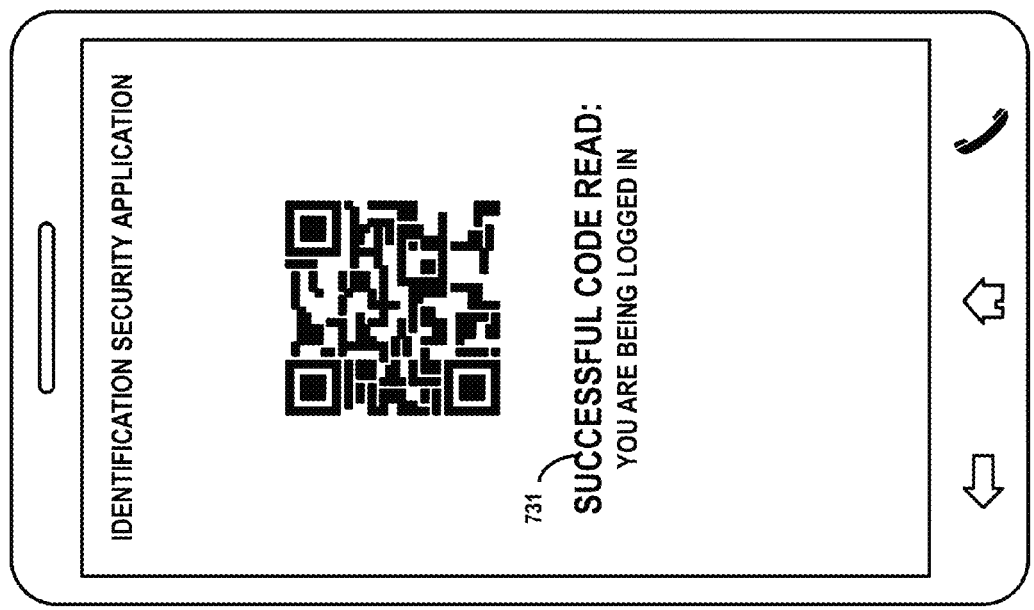

FIGS. 7A-7D are diagrams of user interfaces utilized in the processes of FIGS. 3-4, according to various embodiments. FIG. 7A features a possible interface 700 that may be seen on a relying party device 103, which illustrates a QR code 701 and alternative login prompts for username 703, password, 705, and token code 707 at the bottom of the page. In another embodiment, there is a field (not shown) that would allow the user to select a different format for the authentication code. FIG. 7B features the user device 101 utilizing a user interface 710, which illustrates a home screen for application 125. From the home screen, the application may alert the user that the application is currently registered as evidenced by acknowledging the user by name (711) and indicating his status as "You are logged in" (713). Toward the top of the application, the user may tap on the "Scanner" tab (715) to initiate capturing an authentication code. FIG. 7C illustrates a UD 101 with application 125 capturing a QR code 701 from user interface 700 (not shown). The scanner tab 721 is active and the UD 101's sensor 117 (camera) has captured an image 723 of the QR code 701. The user may hit the "Submit" key 725 if the user feels the image has been captured correctly, or the user may hit the "Cancel" key (727) if the user would like to capture another picture of the authentication code. In another embodiment, the application 125 may be set to automatically submit the media capture to the authentication platform 119. FIG. 7D illustrates a user interface 730 of an authentication result for a user. The interface 730 may display a message conveying the code has been successfully read and the user is being logged into the site 731.

Figure 8:
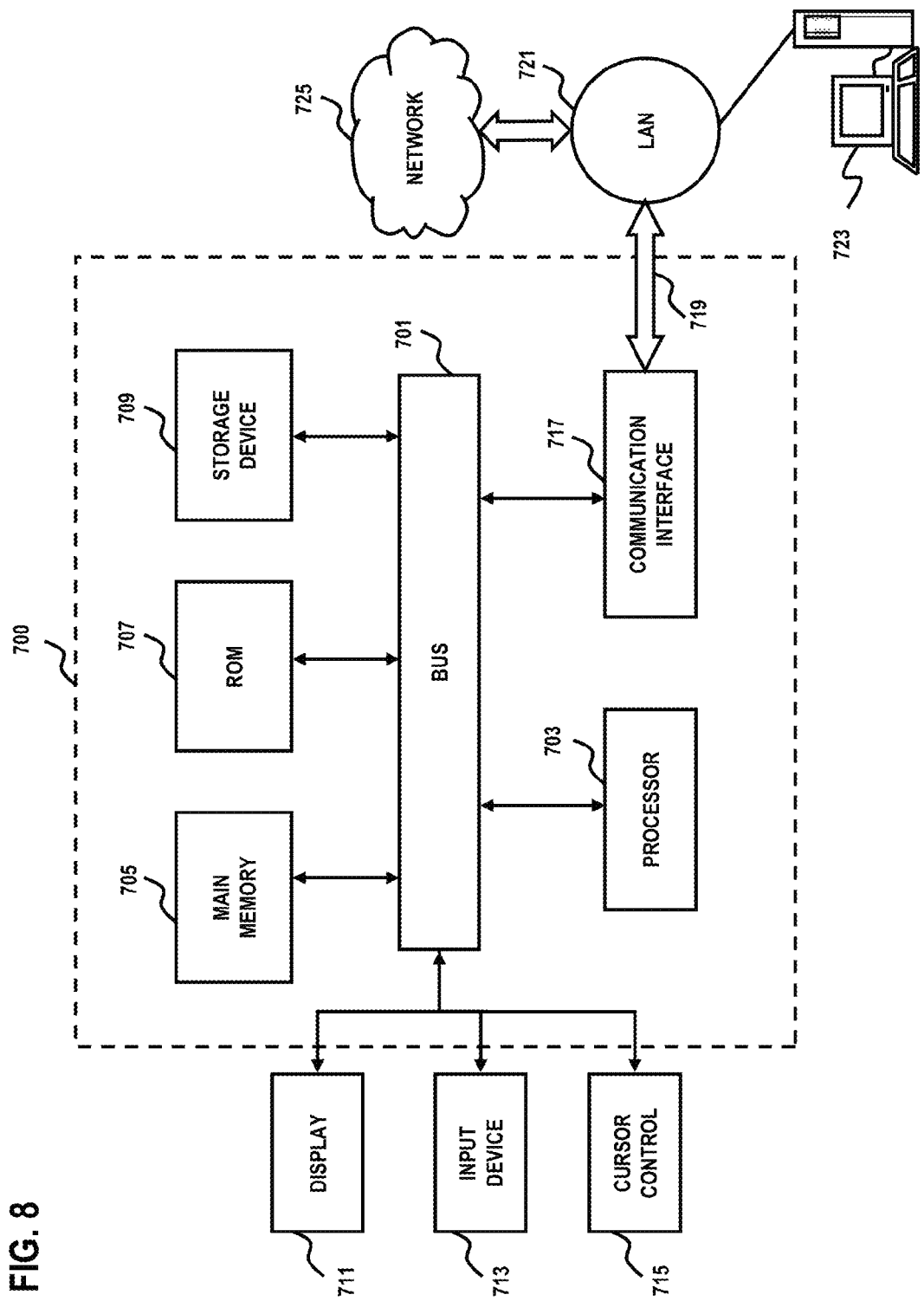
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

An apparatus, method, and software for processing log information across multiple services running multiple processes, such as across a system used by a telecommunications service provider, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to processing log information for a telecommunications service provider, it is contemplated that these embodiments have applicability to systems operated by different organizations and to other operations wherein log information is collected.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 9 illustrates a chip set 900 upon which an embodiment of the invention may be implemented. Chip set 900 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 2-4, 7, and 9A-9D.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method for zero sign on authentication of a user comprising:
   receiving at an authentication server a request sent over a communication network from a relying party for an authentication code for presentation in an authentication user interface, wherein the authentication user interface is presented by the relying party at a first device, and wherein the request includes a selection by the user of a format that the authentication code should be in, the authentication server comprising a processor and a memory that stores registered devices and user profiles associated with the registered devices, wherein the processor:
   transmits the authentication code over the communication network to the relying party;
   receives the authentication code transmitted over the communication network from a second device associated with the user;
   authenticates the user at a first level of authentication with respect to the relying party by determining that the second device associated with the user has read the authentication code from the authentication user interface of the first device and the second device is a previously registered device,
   wherein reading the authentication code from the authentication user interface of the first device with the second device for authenticating the user and transmitting the read authentication code over the communication network from the second device associated with the user includes no decoding of the authentication code;
   transmits a message regarding a status of the zero sign on authentication of the user over the communication network to the second device for presentation to the user; and sends a request to the second device for the user to provide a second level of authentication in response to the user undertaking an activity requiring a higher level of authentication than the first level of authentication,
   wherein the second level of authentication is a biometric authentication.

2. The method of claim 1, wherein the determination that the second device has read the authentication code is based on a validation of the authentication code.

3. The method of claim 1, wherein the processor further: generates the authentication code as a unique code for a session of the authentication user interface.

4. The method of claim 3, wherein the authentication user interface is presented at a point of access.

5. The method of claim 4, wherein a login of the user is initiated via the point of access if the authentication of the user is successful.

6. The method of claim 1, wherein the authentication code is presented in the authentication user interface in a machine readable form, and wherein the machine readable form includes one or more audio-based forms, one or more visual-based forms, or a combination thereof.

7. The method of claim 6, wherein the one or more visual-based forms includes a barcode, and wherein the reading of the authentication code by the second device is by a barcode scanning application.

8. A non-transitory computer-readable storage medium carrying one or more sequences of one or more instructions stored thereon executed by a processor to perform a method for zero sign on authentication of a user, the method comprising:
   receiving a request sent over a communication network from a relying party for an authentication code for presentation in an authentication user interface, wherein the authentication user interface is presented by the relying party at a first device, and wherein the request includes a selection by the user of a format that the authentication code should be in:
   transmitting the authentication code over the communication network to the relying party;
   receiving the authentication code transmitted over the communication network from a second device associated with the user;
   authenticating the user at a first level of authentication with respect to the relying party by determining that the second device associated with the user has read the authentication code from the authentication user interface of the first device and the second device is a previously registered device,
   wherein reading the authentication code from the authentication user interface of the first device with the second device for authenticating the user and transmitting the read authentication code over the communication network from the second device associated with the user includes no decoding of the authentication code;
   transmitting a message regarding a status of the zero sign on authentication of the user over the communication network to the second device for presentation to the user; and sending a request to the second device for the user to provide a second level of authentication in response to the user undertaking an activity requiring a higher level of authentication than the first level of authentication,
   wherein the second level of authentication is a biometric authentication.

9. The non-transitory computer-readable storage medium of claim 8, wherein the determination that the second device has read the authentication code is based on a validation of the authentication code.

10. The non-transitory computer-readable storage medium of claim 8, wherein the method further comprises:
    generating the authentication code as a unique code for a session of the authentication user interface.

11. The non-transitory computer-readable storage medium of claim 10, wherein the authentication user interface is presented at a point of access.

12. The non-transitory computer-readable storage medium of claim 11, wherein a login of the user is initiated via the point of access if the authentication of the user is successful.

13. The non-transitory computer-readable storage medium of claim 8, wherein the authentication code is presented in the authentication user interface in a machine readable form, and wherein the machine readable form includes one or more audio-based forms, one or more visual-based forms, or a combination thereof.

14. The non-transitory computer-readable storage medium of claim 13, wherein the one or more visual-based forms includes a barcode, and wherein the reading of the authentication code by the second device is by a barcode scanning application.

* * * * *